United States Patent [19]
Rosati

[11] Patent Number: 4,655,663
[45] Date of Patent: Apr. 7, 1987

[54] MACHINE FOR STACKING BUNDLES OF SIGNATURES AND LIKE PRODUCTS
[75] Inventor: Domenico Rosati, Turin, Italy
[73] Assignee: R.O.M. S.r.l., Turin, Italy
[21] Appl. No.: 672,354
[22] Filed: Nov. 16, 1984
[51] Int. Cl.[4] .............................................. B65G 57/30
[52] U.S. Cl. .................................... 414/31; 198/414; 414/55; 414/96
[58] Field of Search ....................... 414/31, 55, 62, 64, 414/96; 198/414

U.S. PATENT DOCUMENTS

| | | | |
|---|---|---|---|
| 1880077 | 9/1932 | Dill et al. ................................. | 414/31 |
| 2947125 | 8/1960 | Wilson et al. ......................... | 414/96 X |
| 3231101 | 1/1966 | Cooper ................................. | 414/96 X |
| 3904045 | 9/1975 | Thibault .............................. | 414/96 X |

[56] References Cited

FOREIGN PATENT DOCUMENTS

| | | |
|---|---|---|
| 1126803 | 10/1959 | Fed. Rep. of Germany. |
| 2432579 | 1/1976 | Fed. Rep. of Germany. |
| 597580 | 3/1978 | U.S.S.R. |
| 2935263 | 8/1979 | Fed. Rep. of Germany. |
| 3236163 | 5/1983 | Fed. Rep. of Germany. |

OTHER PUBLICATIONS

Abstract of Japanese application No. 56-69296 (published in vol. 7, No. 41); Patent No. 57-189,965, Nov. 22, 1982.

*Primary Examiner*—Leslie J. Paperner
*Attorney, Agent, or Firm*—Barnes & Thornburg

[57] ABSTRACT

A machine for stacking bundles of signatures and like products supplied in a continuous flow with their backs oriented in the same direction is provided by this invention. The machine comprises a support frame, a substantially horizontal endless conveyor supported by the frame having an input end for supplying the products to be stacked and an output end of loading the stacked products, and a platform for rotating an individual product. The platform is mounted rotatably on the frame about a vertical axis passing through the conveyor, and is translatable along the axis between a lowered position of substantial alignment with the plane of the conveyor, and a raised position in which the products on the conveyor can pass beneath the platform. The platform effects cyclically a raising from the conveyor of a product supply to the conveyor, rotating the raised product about the vertical axis so as to orient the back of this raised product in a direction diametrically opposed to that of its supply to the conveyor, and deposits the product with the oppositely-oriented back on the conveyor. The platform provides a horizontal support which supports said product over substantially the entire horizontal plane of said product. The machine allows stable stacks to be formed and has the qualities of speed and precision in operation, as well as high reliability and simple construction.

15 Claims, 11 Drawing Figures

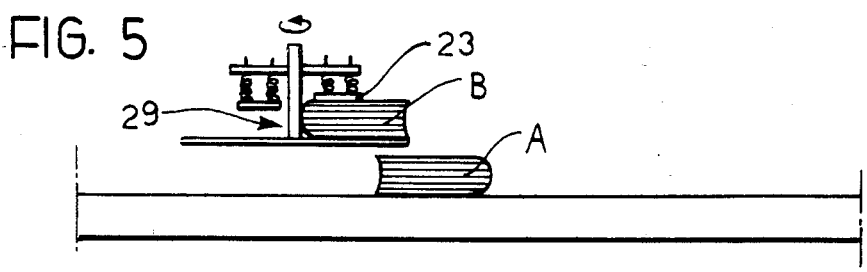
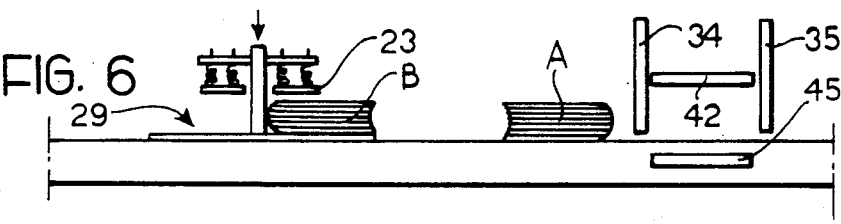
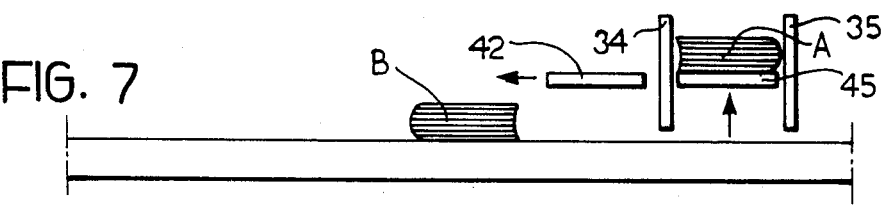
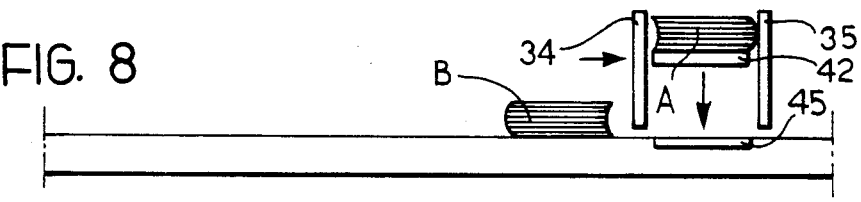
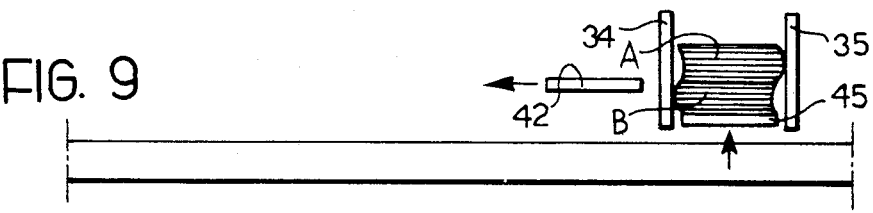
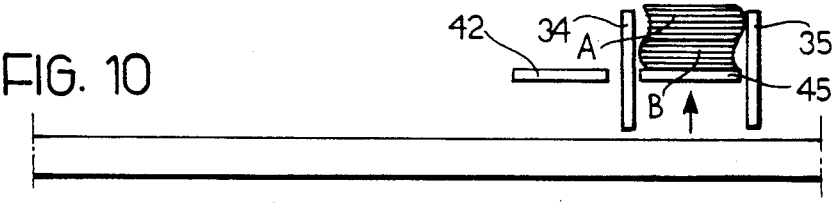

MACHINE FOR STACKING BUNDLES OF SIGNATURES AND LIKE PRODUCTS

The present invention relates to stacking machines and is particularly concerned with a machine for stacking bundles of signatures and like products (sewn and unsewn books, magazines, etc) supplies in a continuous flow with their backs in the same orientation, that is, their backs facing in the same direction.

To form a stable stack it is essential that alternate products in the stack be arranged with their backs facing in opposite directions.

The object of the present invention is to provide a stacking machine of the type specified, which can form stable stacks and which has the important qualities of speed and precision in operation, as well as a notable constructional simplicity and high reliability.

According to the present invention, this object is achieved by means of a machine of the type specified above, characterised in that it comprises:

(a) a support frame;
(b) a substantially horizontal endless conveyor supported by the frame and having an input end for supplying the products to be stacked and an output end for unloading the stacked products;
(c) a platform mounted rotatably on the frame about a vertical axis passing through the conveyor, the platform also being translatable along the axis between a lowered position of substantial alignment with the plane of the conveyor and a raised position in which the products on the conveyor can pass below the platform, in order to effect cyclically a sequence of operations comprising:
    the raising, from the conveyor, of one product of each pair supplied to the conveyor;
    the rotation of the raised product about the said axis so as to orient the back of this product in a direction diametrally opposite that of its supply of the conveyor, and
    the depositing of the product with the oppositely-oriented back on the conveyor;
(d) a plurality of vertical guides above the output end of the conveyor and together defining a stacking cage with a supply opening at its lower end;
(e) a flat support member movable horizontally between an advanced position in which the support member extends through the supply opening and can support products collected in the stacking cage, and a withdrawn position clear of this opening, and
(f) a loading member movable vertically between the plane of the conveyor and the opening of the stacking cage, the movement of the loading member being coordinated with the movement of the support member so as to effect, for each of the products, a sequence of operations comprising:
    the raising of the product from the conveyor against the lower surface of the support member in the advanced position;
    the return of the support member towards its withdrawn position in an arrangement in which the loading member supports the stack formed by the products collected in the stacking cage and the product raised from the conveyor;
    the further raising of the loading member towards the position in which the lower surface of the stack lies in the plane of movement of the support member, and
    the return of the support member towards its advanced position and the lowering of the loading member The invention will now be described, purely be way of non-limiting example, with reference to the appended drawings, in which:

FIGS. 3 to 11 illustrate schematically the sequence of operation of the machine according to the invention.

Figure 1:
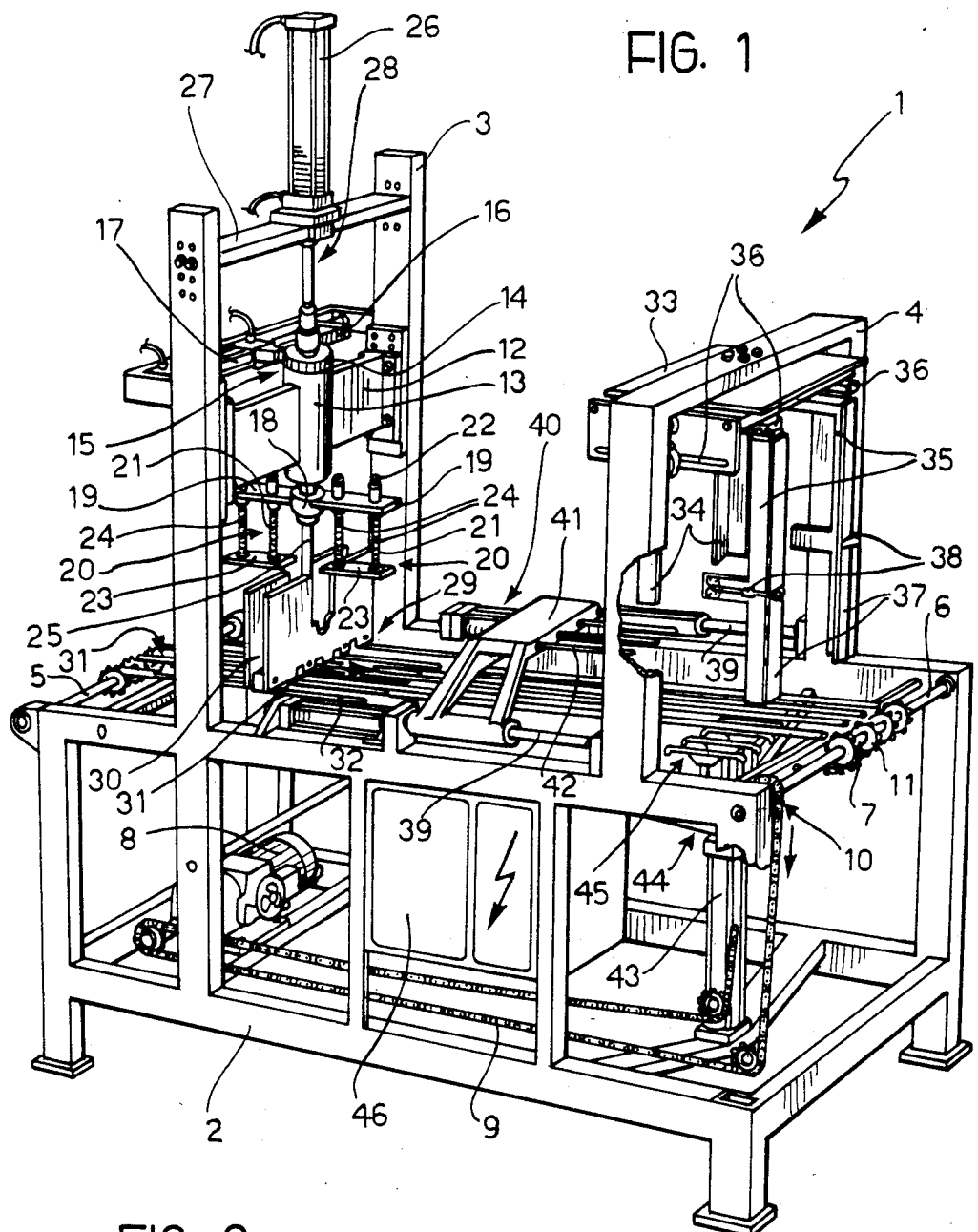
FIG. 1 is a perspective view which illustrates schematically the structure of the machine according to the invention.
Figure 3:
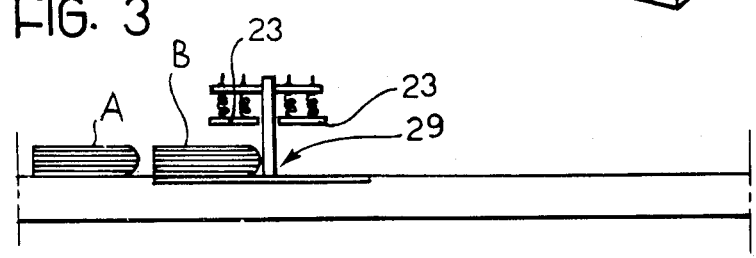
Figure 2:
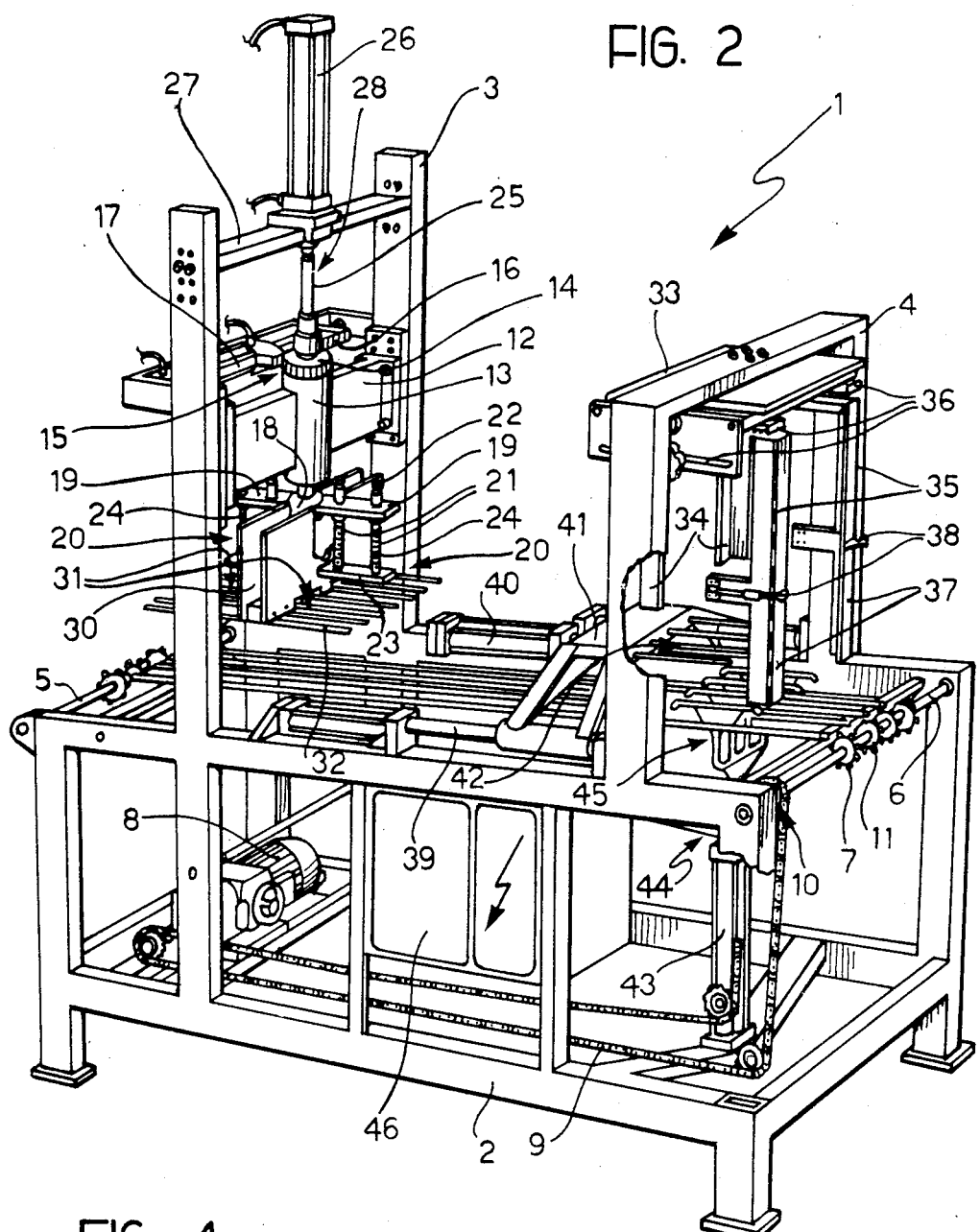
FIG. 2 is a perspective view substantially similar to FIG. 1, which illustrates some of the elements of FIG. 1 in a different position of operation.

In FIGS. 1 and 2, a machine for stacking bundles of signatures and like products (such as, for example, sewn and unsewn books, magazines, etc) is generally indicated 1.

The machine 1 is supported by a frame 2 of welded metal sections provided at the top with two portal-shaped support structures, indicated 3 and 4.

At the two opposite ends of the upper surface of the frame 2, which is of approximately parallelepipedal form, are mounted two shafts 5, 6 on which are keyed return pulleys for a plurality of chains 7 whose upper passes are arranged side by side so as to leave a separation space of a certain width between two adjacent chains.

The upper passes of the chains 7 define a conveying plane movable in a longitudinal direction relative to the frame 2.

The chains 7 are driven by a motor 8 mounted on the lower part of the frame 2, which, through a chain drive 9, rotates a sprocket wheel 10 keyed onto the shaft 6.

In the embodiment illustrated, the motor 8 is rotated in the direction that causes the upper passes of the chain 7 to advance from the shaft 5 to the shaft 6, as shown schematically by the arrow near the shaft 5.

In a manner already known in itself, the chains 7 are provided externally with forked supports for rollers 11 (for example, plastics rollers) intended to come into contact with the products supplied to the conveyor at the input end situated in correspondence with the shaft 5.

The use of the rollers 11 is designed to allow possible sliding of the conveyed products relative to the chains 7, in order to prevent blockages or stoppages when, as will be better seen below, the products are halted momentarily during their translation beneath the portal structures 3 and 4.

The portal structure 3 comprises an intermediate cross member 12 provided centrally with a tubular element 13 having a vertical axis. Within the tubular element 13 is rotatably mounted a sleeve 14 with a ring gear 15 at its upper end. The gear 15 engages a rack 16 movable in a horizontal direction parallel to the cross member 12 through the action of a pneumatic or hydraulic cylinder 17.

At its lower end, the sleeve 14 has an annular thickening 18 from which two arms 19 project in diametrally opposite directions to each other. On each of these arms is mounted a slide member 20 comprising a pair of rods 21 slidable vertically in guide bushes 22 fixed to the arm 19, and a lower plate 23 kept in a horizontal position by these rods 21.

Helical springs 24 fitted around the rods 21 urge the plates 23 (which, as will be better understood from the following, are intended to act as presser-feet) towards a lower travel limit position defined by the abutment of the upper ends of the rods 21, which have enlarged end parts, against the edges of the upper openings of the bushes 22.

A shaft 25 connected to the rod of a further pneumatic or hydraulic cylinder 26 fixed on a further cross member 27 of the structure 3 is slidable axially in the sleeve 14 in a vertical direction.

The shaft 25 has a groove 28 which is slidably engaged by a key (not shown in the drawings) provided on the inside of the sleeve 14. The arrangement is such that the shaft 25 is rigid with the sleeve 14 in the rotational movement caused by the actuation of the cylinder 17.

At its lower end, the shaft 25 carries a platform, generally indicated 29.

The platform 29 comprises a central support element 30 which is fixed firmly to the lower end of the shaft 25 and carries two load surfaces 31 on opposite sides.

The two surfaces 31 have the form of forks and are provided with prongs 32 which extend horizontally in vertical planes intermediate the vertical planes in which the upper passes of the chains 7 lie. In other words, the prongs 32 are staggered relative to the upper passes of the chains 7. This means that, when the platform 29 is lowered, the prongs 32 are introduced into the spaces between the chains 7 in an arrangement in which the load surfaces defined by the prongs 32 are substantially coplanar with, or preferably in a position slightly lower than, the plane of transport of the products defined by the rollers 11 with which the chains 7 are provided.

To the cross member of the portal structure 4 is fixed, for example, by bolting, a plate 33 from which four L-shaped guides grouped into two pairs, indicated 34 and 35 respectively, project downwardly.

The guides 34 and 35 together define a parallelepipedal space within which the stacked products are collected.

In a manner known in itself, the upper ends of the guides 34, 35 are connected to the plate 33 by adjustable members, generally indicated 36, in an arrangement whereby the relative position of the guides 34 and 35 can be adjusted in such a way as to adapt the dimensions of the stacking cage to the dimensions of the products to be stacked.

In particular, the guides 35, which are downstream of the guides 34 in the direction of transfer of the products on the conveyor chains 7, each have a side 37 which can be oriented selectively between two positions of operation through the action of a pneumatic or hydraulic cylinder 38. In the first position of operation, which is illustrated in the drawings, the sides 37 extend in a plane transverse the chains 7, and function as containment and guiding elements for the products being stacked. In the other operating position, each of the sides 37 is arranged in a position coplanar with the other side of the guide 35, so as to lie in a vertical plane parallel to the upper passes of the chains 7. In this condition, as will better seen later on, the stacked products can be removed from the stacking cage defined by the guides 34 and 35.

Two parallel cylindrical guides, indicated 39, are fixed in positions intermediate the support structures 3 and 4 along respective sides of the upper surface of the frame 2.

A portal member 41 which straddles the conveying plane defined by the upper passes of the chains 7 is movable on the guides 39 longitudinally relative to the frame 2 under the action of a further pneumatic or hydraulic cylinder 40.

A plurality of horizontal rods 42 in the form of prongs extend from one side of the crosspiece of the member 41. The portal member 41 has a height such as to permit the products to be stacked to be moved freely by the chains 7.

A further pneumatic or hydraulic cylinder 43 is mounted vertically on the lower part of the frame 2. The cylinder 43 occupies an approximately central position relative to the plan of the stacking cage defined by the guides 34 and 35.

A comb-like member, generally indicated 44, is mounted on the rod of the cylinder 43 and is provided with a plurality of T-shaped teeth, indicated 45. The heads of the teeth 45, which together define a horizontal load surface having a grille-like structure, are oriented longitudinally relative to the frame 2 and lie in vertical planes intermediate the chains 7. The arrangement is such that, when the cylinder 43 is actuated, the comb-like member 44 can be raised from the position illustrated in FIG. 1, in which the plane of the grille defined by the teeth 45 is at a level below the conveying plane of the products on the chains 7, to an elevated position in which the plane of the grille is susbtantially aligned with the plane of movement of the prongs 42 carried by the member 41. An intermediate position in the raising movement of the comb-like member 44 is illustrated in FIG. 2.

The assembled position of the prongs 42 on the crosspiece of the member 41 is selected so as to prevent any interference between these prongs and the heads of the teeth 45 when the member 41 is in the advanced position illustrated in FIG. 2 (with the prongs 42 extending through the supply opening of the product-stacking cage) and the comb-like member 44 is in the fully raised position.

Finally, an electro-pneumatic (or possibly hydraulic) main control, indicated 46, is intended to control the operation of the motor 8 and the cylinders 17, 26, 38, 40 and 43, so as to effect the automatic carrying out of an operating cycle which will now be described with reference to FIGS. 3 to 11.

The products to be stacked (bundles of signatures, books, magazines, etc) are supplied to the input end of the machine (the counter shaft 5) as a continuous flow of products with the same orientation, that is, products with their backs all facing in the same direction. Two of these products are schematically indicated A and B in FIGS. 3 to 11.

In the initial operating condition, the platform 29 is in its lowered position, that is, in the position in which the prongs 32 of the load surfaces 31 extend within the spaces between the chains 7, slightly below the product conveying plane defined by the rollers 11 with which the chains are provided.

Figure 4:
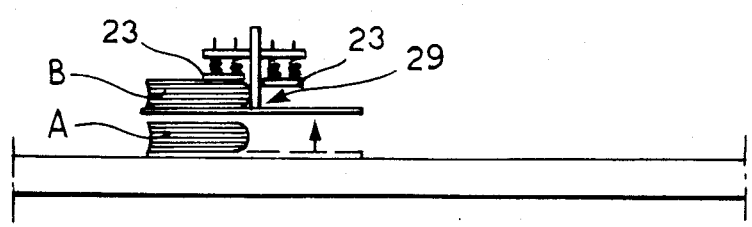

The product (B) supplied first is therefore free to be carried above the prongs 32 of that load surface 31 facing the input end of the machine. As soon as the product B is wholly above the load surface 31 (FIG. 3), or when the leading edge of the product-constituted, in the example illustrated, by its back-is brought into position against the central support element 30 of the platform 29, the main control 46 actuates the cylinders 26, causing the platform to be raised (FIG. 4). The raising of the platform has the effect of bringing the product lifted from the conveying plane into a position of abutment against the presser-foot 23 which, through the action of the springs 24, keeps the product firmly in its loaded position on the platform 29.

With the platform 29 in the raised position, the product (A) supplied to the machine immediately after the product loaded on the platform 29 is free to advance on the chain 7 below this platform (see FIG. 4).

Simultaneously, the main control 46 operates the cylinder 17 which rotates the platform 29 about the axis defined by the shaft 25 (FIG. 5).

The product B is therefore rotated in such a way that its back is oriented in the opposite direction to that in which the back was oriented when the product B was supplied to the stacking machine.

With the subsequent lowering of the platform 29, controlled by the main control 46 through the cylinder 26, the product B (with its back turned in the direction opposite that of its supply) is replaced on the chains 7 on which this product advances behind the product A (FIG. 6).

When the platform 29 is lowered the product B is disengaged from the presser-foot 23 and is therefore free to be moved forward by the chains 7.

With its return to the lowered position, and the placing of the product B on the chains 7, the platform 29, which is provided with two diametrally opposed load surfaces 31, is positioned so as to be able to carry out immediately the operation of reversing the way in which the back of another product (not illustrated in the drawings) supplied to the stacking machine faces.

Thus, a continuous flow of products to be stacked is developed on the conveyor formed by the chains 7, downstream of the platform 29, in which each product is oriented in such a manner that its back faces in a direction opposite the direction in which the backs of adjacent products race.

This flow of products is directed towards a stacking station close to the output end of the conveyor formed by the chains 7.

The stacking station is formed substantially by the vertical guides 34, 35, the movable portal member 41, and the comb-like lifting member 44 beneath the stacking cage defined by the guides 34, 35.

The operation of stacking the product is carried out by the coordinated movement of the portal member 41, which functions as a support member, and the comb-like member 44, which functions as a loading member.

FIGS. 6 to 8 illustrate schematically the operation of loading the first product of a stack (in this case, the product A) between the guides 34 and 35.

When the product to be stacked is above the load surface defined by the heads 45 of the teeth of the comb-like member 44 (a condition which can be identified by detecting the abutment of the leading edge of the product A against the lower ends of the sides 37 of the guides 35 oriented transverse the chains 7), the main control 36 simultaneously effects the raising of the surface 45 by means of the cylinder 43, and the return of the member 41 to the withdrawn position illustrated in FIG. 1 by means of the cylinder 40.

With the member 41 in the withdrawn position, the prongs 42 are clear of the supply opening of the stacking cage, which permits the comb-like member 44 to lift the product A to be stacked until the lower surface of this product is in substantial alignment with the horizontal sliding plane of the prongs 42 (FIG. 7).

On completion of the raising movement of the comb-like member 44, the support member 41 is again advanced to the position in which the prongs 42 extend through the supply opening of the stacking cage, interdigitating without interference between the bars forming the heads of the teeth 45 of the comb-like member 44.

In these conditions, the member 44 (the loading member) can be lowered again (FIG. 8) while the product A is retained in the stacking cage by the prongs 42 of the member 41.

As soon as the loading member 44 is lowered, the product (B), which follows the product (A) just stacked, is brought above the bars 45 by the chains 7, as described previously.

The product B can then be lifted into the stacking cage.

The action of lifting the product B is carried out in two successive steps which are completed substantially without interruption.

During the first lifting step, the upper surface of the product B is brought into contact with the lower surface of the plane defined by the prongs 42 of the member 41.

Once this raised position is reached, the member 41 is returned to the withdrawn position illustrated in FIG. 1. The prongs 42 thus disengage the lower surface of the product A already stacked, causing this product to fall back (with a small vertical displacement) onto the underlying product B (FIG. 9).

The raising movement of the loading member 44 continues until the stack formed by the product B and overlying product A is in a position in which the lower surface of the product B lies in the horizontal sliding plane of the prongs 42 (FIG. 10).

At this point, in a manner substantially similar to that described above with reference to FIG. 8, the member 41 is returned to the advanced position in which the prongs 42 extend horizontally below the lower surface of the last product stacked (B), supporting the stack thus formed within the stacking cage. The loading member 44 can then be lowered (FIG. 11) so as to start the operation of loading another product in the stack.

The stacking operation continues in the manner described until a stack of a predetermined number of products is built up in the cage defined by the guides 34 and 35. The stack thus completed can be unloaded from the machine by lifting the loading member 44 into the position in which the bars 45 are coplanar with the prongs 42 and returning the member 41 to the withdrawn position.

The stack supported by the loading member 44 can then be deposited on the chains 7 by lowering the comb-like member 44.

When the lower surface of the member at the bottom of the stack comes into contact with the rollers 11, the sides 37 of the guides 35 are oriented by the cylinders 38 into alignment with the sides of the frame 2.

In this condition, the stack is moved out of the stacking cage by the chains 7 so as to allow it be unloaded from the stacking machine.

I claim:

1. A machine for stacking bundles of signatures and like products supplied in a continuous flow with their backs oriented in the same direction, comprising:
   a support frame;
   a substantially horizontal endless conveyor supported by the frame and having an input end for supplying the products to be stacked and an output end for unloading the stacked products;

a platform means mounted rotatably on the frame about a vertical axis passing through the conveyor, said platform means also being translatable along the axis between a lowered position of substantial alignment with the plane of the conveyor, and a raised position in which the products on the conveyor can pass beneath the platform means, in order to effect cyclically a raising from the conveyor of a product supplied to the conveyor, rotating the raised product about said axis so as to orient the back of this raised product in a direction diametrically opposed to that of its supply to the conveyor, and the depositing of the product with the oppositely-oriented back on the conveyor;

wherein said platform means provides a horizontal support for said product which supports said product over substantially the entire horizontal plane of said product.

2. A machine as defined in claim 1, wherein the conveyor comprises a plurality of flexible elements in closed loops with horizontal passes lying side by side and together defining the conveying plane, and longitudinal spaces are defined between said adjacent horizontal passes, and wherein said platform means comprises at least one forked loading member with prongs which can extend horizontally within said longitudinal spaces into the lowered position of the platform means.

3. A machine as defined in claim 1, wherein said rotatable platform means comprises two loading surfaces on opposite sides of said axis of rotation.

4. A machine as defined in claim 1, wherein sprung members are associated with the rotatable platform means to clamp the products raised from the conveyor during the rotation about the axis.

5. A machine as defined in Claim 4, wherein the platform has associated therewith a support device comprising:

a supporting structure fixed to said frame;
a sleeve-shaped body mounted on said support structure for rotation about the vertical axis;
first drive means for rotating said sleeve-shaped body;
a shaft slidable axially within said sleeve-shaped body and coupled for rotation with the sleeve-shaped body, said shaft carrying the platform its lower end;
second drive means for sliding the shaft in the sleeve-shaped body, and
sprung slide members connected to said sleeve-shaped body in an arrangement in which, as a result of the raising of the shaft carrying the platform, the platform is brought close to said slides to carry the products raised from the conveyor into abutment with the slides.

6. A machine as defined in claim 1, further comprising a plurality of vertical guides above the output end of the conveyor and together defining a stacking cage with a supply opening at its lower end;
a flat support member movable horizontally between an advanced position in which it extends through the supply opening, and a withdrawn position clear of the opening, and
a loading member movable vertically between the plane of the conveyor and the opening of the stacking case, the movement of the loading member being coordinated with the movement of the support member so as to effect, for each of said products a sequence of operations comprising:

the return of the support member to the withdrawn position in an arrangement in which the loading member supports the stack formed by the products collected in the stacking cage and the product raised from the conveyor;

the further raising of the loading member towards the position in which the lower surface of said stack lies substantially in the plane of movement of the support member, and the return of the support member to its advanced position and the lowering of the loading member.

7. A machine as defined in claim 6, wherein the conveyor comprises a plurality of flexible elements in closed loops with horizontal passes lying side by side and together defining the conveying plane, and wherein:

the loading member comprises a plurality of horizontal bars together defining a surface for the lifting of the products having a grille-like structure;

each of said bars is movable vertically in a plane between two of said horizontal passes, and the support member has substantially a forked form with horizontal prongs which can extend to the intersection of the plane of the opening of the stacking cage with vertical planes staggered relative to the vertical planes of movement of the bars of the loading member, so as to allow free interdigitation of said prongs and said bars when the support member is brought into the forward position and the loading member is in the fully raised position.

8. A machine as defined in claim 7, wherein said loading member comprises a comb-like body arranged substantially beneath the plane of the conveyor and having T-shaped teeth the heads of which constitute said horizontal bars, and drive means are associated with said comb-like body to effect its vertical translation between a lowered position in which said bars are substantially coplanar with the conveyor, and the fully raised position in which said bars are substantially coplanar with the prongs of the support member.

9. A machine as defined in claim 7, wherein said support member is substantially in the form of a portal above the conveyor, and wherein horizontal guides are provided on the frame along the sides of the conveyor to allow the translation of the support member between the advanced position and the withdrawn position.

10. A machine as defined in claim 6, wherein the stacking cage comprises four L-shaped guides each arranged in a corner position with respect to the products to be stacked, and wherein one of the sides of each guide of the pair of guides facing outwardly of the machine in the direction of advance of the products on the conveyor can be oriented in a position of alignment with the other side of said guide, to allow the stacked products to be removed from the stacking cage.

11. A machine as defined in claim 10, wherein a portal member is associated with the frame for supporting said guides, and wherein the position of fixing of the guides to said member is selectively adjustable so as to adapt the dimensions of the stacking cage to the dimensions of the products to be stacked.

12. A machine for stacking bundles of signatures and like products supplied in a continuous flow with their backs oriented in the same direction, comprising:

(a) a support frame;

(b) a substantially horizontal endless conveyor supported by the frame and having an input end for supplying the products to be stacked and an output end for unloading the stacked products;

(c) a platform mounted rotatably on the frame about a vertical axis passing through the conveyor, said platform also being translatable along the axis between a lowered position of substantial alignment with the plane of the conveyor, and a raised position in which the products of the conveyor can pass beneath the platform, in order to effect cyclically a sequence of operations comprising:

the raising, from the conveyor, of one product of each pair supplied to the conveyor;

the rotation of the raised product about said axis so as to orient the back of this product in a direction diametrically opposed to that of its supply to the conveyor, and the depositing of the product with the oppositely-oriented back on the conveyor;

(d) a plurality of vertical guides above the output end of the conveyor and together defining a stacking cage with a supply opening at its lower end;

(e) a flat support member movable horizontally between an advanced position in which it extends through the supply opening and can support the products collected within said stacking cage, and a withdrawn position clear of the opening, and (f) a loading member movable vertically between the plane of the conveyor and the opening of the stacking cage, the movement of the loading member being coordinated with the movement of the support member so as to effect, for each of said products, a sequence of operations comprising:

the return of the support member to the withdrawn position in an arrangement in which the loading member supports the stack formed by the products collected in the stacking cage and the product raised from the conveyor;

the further raising of the loading member towards the position in which the lower surface of said stack lies substantially in the plane of movement of the support member, and the return of the support member to its advanced position and the lowering of the loading member, wherein the conveyor comprises a plurality of flexible elements in closed loops with horizontal passes lying side by side and together defining the conveying plane, and longitudinal spaces are defined between said adjacent horizontal passes, and wherein said platform comprises at least one forked loading member with prongs which can extend horizontally within said longitudinal spaces in the lowered position of the platform.

13. A machine for stacking bundles of signatures and like products supplied in a continuous flow with their backs oriented in the same direction, comprising:

(a) a support frame;

(b) a substantially horizontal endless conveyor supported by the frame and having an input end for supplying the products to be stacked and an output end for unloading the stacked products;

(c) a platform mounted rotatably on the frame about a vertical axis passing through the conveyor, said platform also being translatable along the axis between a lowered position of substantial alignment with the plane of the conveyor, and a raised position in which the products on the conveyor can pass beneath the platform, in order to effect cyclically a sequence of operations comprising:

the raising, from the conveyor, of one product of each pair supplied to the conveyor;

the rotation of the raised product about said axis so as to orient the back of this product in a direction diametrically opposed to that of its supply to the conveyor, and the depositing of the product with the oppositely-oriented back on the conveyor;

(d) a plurality of vertical guides above the output end of the conveyor and together defining a stacking cage with a supply opening at its lower end;

(e) a flat support member movable horizontally between an advanced position in which it extends through the supply opening and can support the products collected within said stacking cage, and a withdrawn position clear of the opening, and (f) a loading member movable vertically between the plane of the conveyor and the opening of the stacking cage, the movement of the loading member being coordinated with the movement of the support member so as to effect, for each of said products, a sequence of operations comprising:

the return of the support member to the withdrawn position in an arrangement in which the loading member supports the stack formed by the products collected in the stacking cage and the product raised from the conveyor;

the further raising of the loading member towards the position in which the lower surface of said stack lies substantially in the plane of movement of the support member, and the return of the support member to its advanced position and the lowering of the loading member, wherein said rotatably platform comprises two loading surfaces on opposite sides of said axis of rotation.

14. A machine for stacking bundles of signatures and like products supplied in a continuous flow with their backs oriented in the same direction, comprising:

(a) a support frame;

(b) a substantially horizontal endless conveyor supported by the frame and having an input end for supplying the products to be stacked and an output end for unloading the stacked products;

(c) a platform mounted rotatably on the frame about a vertical axis passing through the conveyor, said platform also being translatable along the axis between a lowered position of substantial alignment with the plane of the conveyor, and a raised position in which the products on the conveyor can pass beneath the platform, in order to effect cyclically a sequence of operations comprising:

the raising, from the conveyor, of one product of each pair supplied to the conveyor;

the rotation of the raised product about said axis so as to orient the back of this product in a direction diametrically opposed to that of its supply to the conveyor, and the depositing of the product with the oppositely-oriented back on the conveyor;

(d) a plurality of vertical guides above the output end of the conveyor and together defining a stacking cage with a supply opening at its lower end;

(e) a flat support member movable horizontally between an advanced position in which it extends through the supply opening and can support the products collected within said stacking cage, and a withdrawn position clear of the opening, and (f) a loading member movable vertically between the plane of the conveyor and the opening of the stacking cage, the movement of the loading member being coordinated with the movement of the support member so as to effect, for each of said products, a sequence of operations comprising:

the return of the support member to the withdrawn position in an arrangement in which the loading member supports the stack formed by the products collected in the stacking cage and the product raised from the conveyor;

the further raising of the loading member towards the position in which the lower surface of said stack lies substantially in the plane of movement of the support member, and the return of the support member to its advanced position and the lowering of the loading member, wherein sprung members are associated with the rotatable platform to clamp the products raised from the conveyor during the rotation about the axis.

15. A machine as defined in claim 14, wherein the platform has associated therewith a support device comprising:

a support structure fixed to said frame;

a sleeve-shaped body mounted on said support structure for rotation about the vertical axis;

first drive means for rotating said sleeve-shaped body;

a shaft slidable axially within said sleeve-shaped body and coupled for rotation with the sleeve-shaped body, said shaft carrying the platform its lower end;

second drive means for sliding the shaft in the sleeve-shaped body, and sprung slide members connected to said sleeve-shaped body in an arrangement in which, as a result of the raising of the shaft carrying the platform, the platform is brought close to said slides to carry the products raised from the conveyor into abutment with the slides.

* * * * *